United States Patent
Hu

(10) Patent No.: US 12,148,106 B2
(45) Date of Patent: Nov. 19, 2024

(54) DATA PROCESSING METHOD AND APPARATUS FOR IMMERSIVE MEDIA, AND COMPUTER-READABLE STORAGE MEDIUM

(71) Applicant: TENCENT TECHNOLOGY (SHENZHEN) COMPANY LIMITED, Guangdong (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 154 days.

(21) Appl. No.: 17/961,003

(22) Filed: Oct. 6, 2022

(65) Prior Publication Data

US 2023/0025664 A1 Jan. 26, 2023

Related U.S. Application Data

(63) Continuation of application No. PCT/CN2021/131108, filed on Nov. 17, 2021.

(30) Foreign Application Priority Data

Dec. 2, 2020 (CN) .......................... 202011399700.4

(51) Int. Cl.
*H04N 13/261* (2018.01)
*G06T 19/00* (2011.01)

(52) U.S. Cl.
CPC ......... *G06T 19/006* (2013.01); *H04N 13/261* (2018.05)

(58) Field of Classification Search
CPC ........................... G06T 19/006; H04N 13/261
See application file for complete search history.

(56) References Cited

U.S. PATENT DOCUMENTS

2019/0220953 A1 7/2019 Zhou
2021/0021806 A1* 1/2021 He .................... H04N 21/8456
(Continued)

FOREIGN PATENT DOCUMENTS

CN 106937156 A 7/2017
CN 108111899 A 6/2018
(Continued)

OTHER PUBLICATIONS

International Search Report for PCT/CN2021/131108, dated Feb. 10, 2022.
(Continued)

*Primary Examiner* — Thai Q Tran
*Assistant Examiner* — Jose M Mesa
(74) *Attorney, Agent, or Firm* — Sughrue Mion, PLLC

(57) ABSTRACT

A data processing method and apparatus for an immersive media file, and a computer-readable storage medium, which can enrich presentation forms of immersive media. The method includes: obtaining a recommended viewport box of the immersive media file, the recommended viewport box being used for defining switching information of a viewpoint and switching information of a recommended viewport of the immersive media file; determining a destination viewpoint and a destination recommended viewport according to the switching information of a current viewpoint and the switching information of a current recommended viewport; and switching to the destination viewpoint and the destination recommended viewport, to present the immersive media file.

20 Claims, 5 Drawing Sheets

(56) References Cited

U.S. PATENT DOCUMENTS

2021/0105313 A1* 4/2021 Wang .................... H04L 65/70
2021/0152808 A1* 5/2021 He ........................ H04N 21/84

FOREIGN PATENT DOCUMENTS

| CN | 108632674 A | 10/2018 |
|----|-------------|---------|
| CN | 110876051 A | 3/2020 |
| EP | 3 422 701 A1 | 1/2019 |
| WO | 2020/068935 A1 | 4/2020 |

OTHER PUBLICATIONS

Written Opinion for PCT/CN2021/131108, dated Feb. 10, 2022.
Extended European Search Report issued Apr. 19, 2024 in Application No. 21899856.5.

* cited by examiner

DATA PROCESSING METHOD AND APPARATUS FOR IMMERSIVE MEDIA, AND COMPUTER-READABLE STORAGE MEDIUM

CROSS-REFERENCE TO RELATED APPLICATION(S)

This application is a continuation application of International Application No. PCT/CN2021/131108, filed on Nov. 17, 2021, which claims priority to Chinese Patent Application No. 202011399700.4, filed with the China National Intellectual Property Administration on Dec. 2, 2020, the disclosures of which are incorporated by reference in their entireties.

FIELD

The disclosure relates to the field of computer technologies, and more specifically to data processing for immersive media.

BACKGROUND

The content of immersive media is typically divided into a plurality of samples (e.g., image frames or video frames), which are encapsulated in track groups according to association. The so-called association indicates that the samples in all the track groups correspond to the same viewpoint, or the samples in one track group correspond to one viewpoint, or the samples in one track group correspond to different viewpoints, but the samples in one track group can only be presented in a certain time series.

However, such association limits encapsulation flexibility of the immersive media to a certain extent, which also limits flexibility of presentation forms of the immersive media. Therefore, enriching the presentation forms of the immersive media is an urgent problem to be solved.

SUMMARY

A data processing method and apparatus for immersive media, and a computer-readable storage medium, which can enrich the presentation forms of the immersive media may be provided.

Some embodiments may provide a data processing method for immersive media, the method being performed by a media playback device, and including: obtaining a recommended viewport box of an immersive media file, the recommended viewport box being used for defining switching information of a viewpoint and switching information of a recommended viewport of the immersive media file; determining a destination viewpoint and a destination recommended viewport according to the switching information of a current viewpoint and the switching information of a current recommended viewport; and switching to the destination viewpoint and the destination recommended viewport, to present the immersive media file.

Some embodiments may provide a data processing method for immersive media, the method being performed by a media production device, and including: obtaining viewpoint information and viewport information in a case of presenting an immersive media file; and configuring a recommended viewport box according to the viewpoint information and the viewport information of the immersive media file, the recommended viewport box being used for defining switching information of a viewpoint and switching information of a recommended viewport of the immersive media file.

Some embodiments may provide a data processing apparatus for immersive media, the apparatus being deployed on a media playback device, and including: an obtaining unit, configured to obtain a recommended viewport box of an immersive media file, the recommended viewport box being used for defining switching information of a viewpoint and switching information of a recommended viewport of the immersive media file; a determining unit, configured to determine a destination viewpoint and a destination recommended viewport according to the switching information of a current viewpoint and the switching information of a current recommended viewport; and a presenting unit, configured to switch to the destination viewpoint and the destination recommended viewport, to present the immersive media file.

Some embodiments may provide a data processing apparatus for immersive media, the apparatus being deployed on a media production device, and including: an obtaining unit, configured to obtain viewpoint information and viewport information of an immersive media file; and an encapsulating unit, configured to encapsulate a recommended viewport box according to the viewpoint information and the viewport information of the immersive media file, the recommended viewport box being used for defining switching information of a viewpoint and switching information of a recommended viewport of the immersive media file.

Some embodiments may provide a computer device, including a processor and a memory. The memory is configured to store a computer program, and the processor is configured to invoke and run the computer program stored in the memory to perform the method according to the foregoing embodiments.

Some embodiments may provide a computer device, including a processor and a memory. The memory is configured to store a computer program, and the processor is configured to invoke and run the computer program stored in the memory to perform the method according to the foregoing embodiments.

Some embodiments may provide a non-transitory computer-readable storage medium. The computer-readable storage medium is configured to store a computer program, and the computer program enables a computer to perform the method according to any one of the foregoing embodiments.

Some embodiments may provide a computer program product. The computer program product includes a computer program instruction, and the computer program instruction enables a computer to perform the method according to any one of the foregoing embodiments.

Some embodiments may provide a computer program. When the program is run on a computer, the computer is enabled to perform the method according to any one of the foregoing embodiments.

Through the above technical solutions, the media production device can encapsulate the recommended viewport box of the immersive media according to the viewpoint information and the viewport information of the immersive media. Further, the media playback device can determine the destination viewpoint and the destination recommended viewport according to the switching information of the current viewpoint and the switching information of the current recommended viewport defined in the recommended viewport box, so as to switch to the destination viewpoint and the destination recommended viewport for presenting the immersive media file. This solution can flexibly determine the switching manner according to the switching information of the viewpoint and the switching information of the recommended viewport defined in the recommended viewport box, to switch the viewpoint and the recommended viewport, which allows the media playback device side to have more diversified presentation forms, thereby enriching application forms of immersive media, and improving the user experience.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict The embodiments relate to data processing technologies for immersive media. The so-called immersive media refers to media files that can provide immersive media content to allow users immersed in the media content to obtain real-world sensory experiences, such as sight, hearing, etc. Generally, the immersive media may be 3 degrees of freedom (3DoF) immersive media, 3DoF+immersive media or 6 degrees of freedom (6DoF) immersive media. The immersive media content includes video content represented in three-dimensional (3D) space in various forms, such as 3D video content represented in spherical form. The immersive media content may be virtual reality (VR) video content, panoramic video content, spherical video content, or 360-degree video content. Therefore, the immersive media may also be called a VR video, a panoramic video, a spherical video or a 360-degree video. In addition, the immersive media content further includes audio content that is synchronous with the video content represented in the 3D space.

Figure 1:
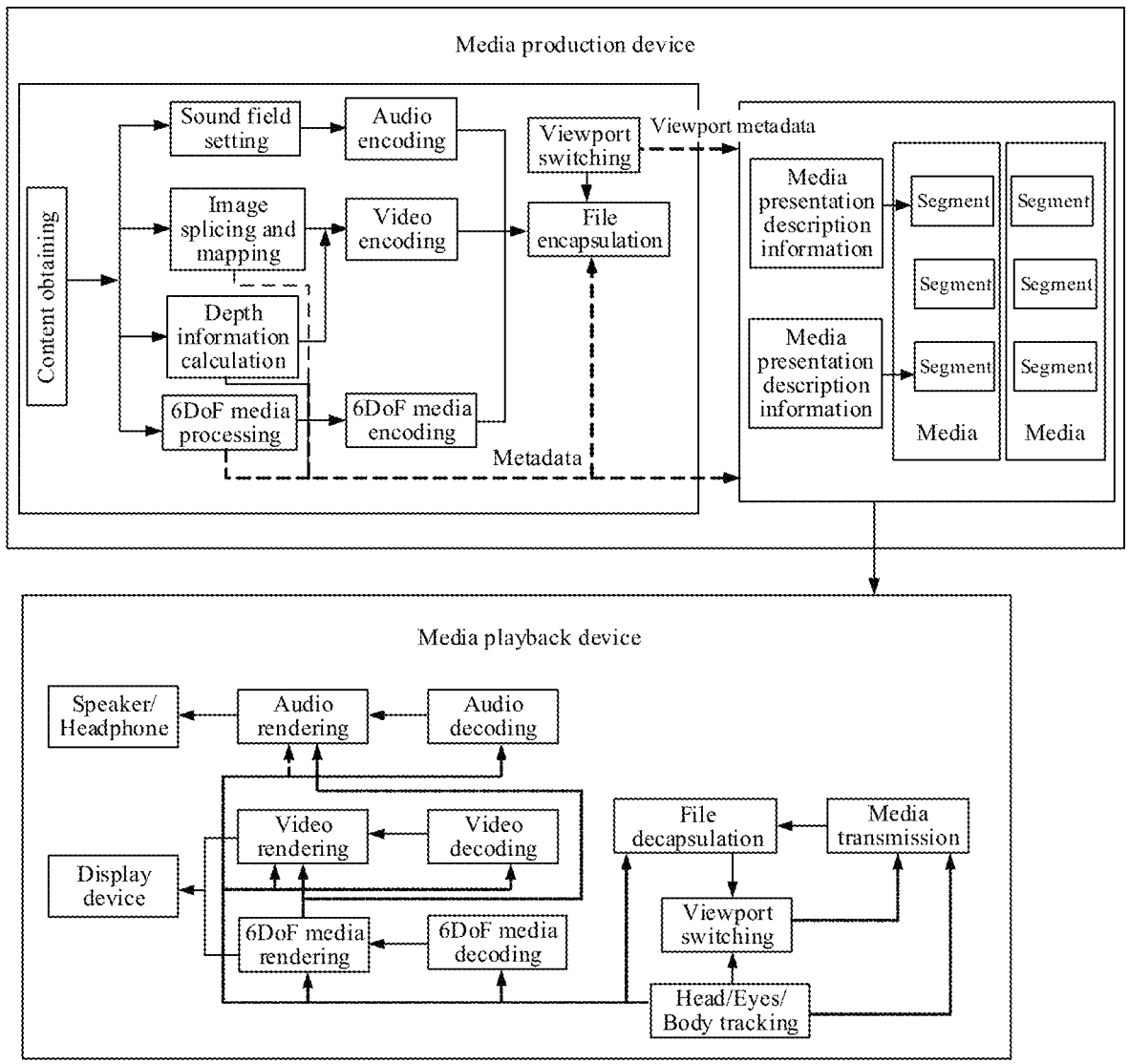
FIG. 1 is an architectural diagram of an immersive media system according to some embodiments.

FIG. 1 shows an architecture diagram of an immersive media system according to some embodiments. As shown in FIG. 1, the immersive media system includes a media production device and a media playback device (or media consumption device). The media production device may refer to a computer device used by a provider of the immersive media (e.g., a media producer of the immersive media). The computer device may be a terminal (e.g., a personal computer (PC), a smart mobile device (e.g., a smart phone), etc.) or a server. The media playback device may refer to a computer device used by a user of the immersive media (e.g., a user). The computer device may be a terminal (e.g., a PC, a smart mobile device (e.g., a smart phone), a VR device (e.g., a VR helmet, VR glasses, etc.)). A data processing process for the immersive media includes a data processing process on a media production device side and a data processing process on a media playback device side.

The data processing process on the media production device side mainly includes: (1) obtaining and production processes of the media content of the immersive media; and (2) encoding and file encapsulation processes of the immersive media. The data processing process on the media playback device side mainly includes: (3) file decapsulation and decoding processes of the immersive media; and (4) a rendering process of the immersive media. In addition, a transmission process of the immersive media is involved between the media production device and the media playback device. The transmission process may be carried out based on various transfer protocols. The transfer protocols herein may include but are not limited to: Dynamic Adaptive Streaming over HTTP (DASH) protocol, HTTP Live Streaming (HLS) protocol, Smart Media Transport Protocol (SMTP), Transmission Control Protocol (TCP), etc.

Figure 2:
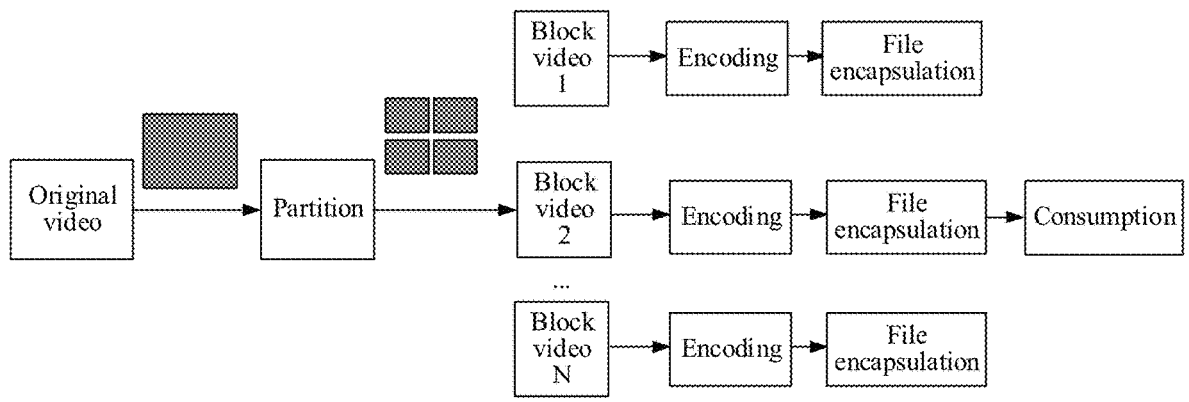
FIG. 2 is a flowchart of a transfer solution of immersive media according to some embodiments.

FIG. 2 shows a flowchart illustrating a transfer solution of immersive media according to some embodiments. As shown in FIG. 2, in order to solve the transfer bandwidth load problem caused by the large size of the immersive media itself, during the processing of the immersive media, an original video is generally spatially partitioned into a plurality of block videos (e.g., block video 1, block video 2, . . . , and block video N), the plurality of block videos are respectively encoded and undergo file encapsulation, and then are transmitted to a client for consumption.

With reference to FIG. 1 and FIG. 2, each process involved in the data processing of the immersive media is described below.

1. The Data Processing Process on the Media Production Device Side:

(1) Obtain the Media Content of the Immersive Media (Namely Content Obtaining as Shown in FIG. 1).

The media content of the immersive media may be obtained through two manners, one of which is to acquire real-world sound-visual scenes by a capture device, and the other one of which is to generate by a computer. In an example embodiment, the capture device may refer to a hardware component provided in the media production device. For example, the capture device refers to a microphone, a camera, a sensor, etc. of a terminal. In another embodiment, the capture device may be a hardware apparatus connected to the media production device, such as a camera connected to a server, which is configured to provide a service of obtaining media content of immersive media for the media production device. The capture device may include but is not limited to: an audio device, a camera device and a sensing device. The audio device may include an audio sensor, a microphone, etc. The camera device may include an ordinary camera, a stereo camera, a light field camera, etc. The sensing device may include a laser device, a radar device, etc. The number of capture devices may be plural. These capture devices are deployed at specific locations in a real space, to simultaneously capture audio content and video content from different perspectives within that space. The captured audio content and video content are synchronized in time and space. Due to the different obtaining manners, media content of different immersive media may correspond to different compression encoding manners.

(2) The Production Process of the Media Content of the Immersive Media.

The captured audio content itself is content suitable for audio encoding of the immersive media. The captured video content can only become content suitable for video encoding of immersive media after a series of production processes. The production process includes:

① Splicing. Since the captured video content is captured by the capture device from different perspectives, splicing refers to splicing the video content (images) captured from these different perspectives into a complete video that can reflect 360-degree visual panorama of the real space. That is, a spliced video is a panoramic video (or a spherical video) represented in 3D space.

② Projection. Projection refers to a process of mapping the 3D video generated by splicing onto a two-dimensional (2D) image. The 2D image generated by projection is known as a projection image. The manner of projection may include but is not limited to: longitude-latitude map projection, and regular hexahedron projection.

(3) The Encoding Process of the Media Content of the Immersive Media (Including Audio Encoding and Video Encoding, 6DoF Media Encoding on Content after 6DoF Media Processing).

The projection image may be encoded directly, or the projection image may be encoded after undergoing regional encapsulation. In modern mainstream video encoding technologies, taking the international video encoding standard High Efficiency Video Coding (HEVC), the international video encoding standard Versatile Video Coding (VVC), and the Chinese national video encoding standard Audio Video Coding Standard (AVS) as examples, a hybrid encoding framework is adopted, to perform a series of operations and processing on an inputted original video signal: block partition structure, predictive coding, transform and quantization, entropy coding or statistical coding, loop Filtering, etc.

(4) The Encapsulation Process of Immersive Media.

An audio bitstream and a video bitstream are encapsulated in a file container according to a file format of the immersive media (such as ISO Base Media File Format (ISOBMF)), to generate a media file resource of the immersive media. The media file resource may be a media file or media fragments to form the media file of the immersive media. In addition, according to a file format requirement of the immersive media, media presentation description (MPD) is used for recording the metadata of the media file resource of the immersive media. The metadata herein is an umbrella term for information related to the presentation of the immersive media. The metadata may include description information of the media content, description information of the viewport, signaling information related to the presentation of the media content, etc. As shown in FIG. 1, the media production device stores the MPD information and the media file resource generated through the data processing process.

A sample is an encapsulation unit in the encapsulation process of a media file. One media file includes a plurality of samples. Taking video media as an example, one sample of the video media is generally one video frame.

2. The Data Processing Process on the Media Playback Device Side:

(1) The File Decapsulation and Decoding Processes of the Immersive Media (Decoding Mainly Includes Audio Decoding, Video Decoding and 6DoF Media Decoding);

The media playback device may adaptively and dynamically obtain the media file resource of the immersive media and the corresponding MPD information from the media production device according to recommendation of the media production device or according to user requirements of the media playback device. For example, the media playback device may determine an orientation and a position of a user according to tracking information of the user's head/eyes/body, and then dynamically request to obtain the corresponding media file resource from the media production device based on the determined orientation and location. The media file resource and the MPD information are transmitted from media production device to the media playback device (media transmission) through a transmission mechanism (such as DASH, SMT). The file decapsulation process on the media playback device side is inversely related to the file encapsulation process on the media production device side. The media playback device decapsulates the media file resource according to the file format requirement of the immersive media to obtain the audio bitstream and the video bitstream. The decoding process on the media playback device side is inversely related to the encoding process on the media production device side. The media playback device decodes the audio bitstream to restore the audio content. In addition, the video decoding process of the video bitstream performed by the media playback device includes the following:

① decoding the video bitstream to obtain a planar projection image;

② converting the projection image into a 3D image by performing reconstruction processing according to the MPD information, the reconstruction process herein referring to a processing of reprojecting the 2D projection image into the 3D space.

(2) The Rendering Process of the Immersive Media.

The media playback device renders the audio content obtained through the audio decoding and the 3D image obtained through the video decoding according to metadata related to rendering, viewpoint and viewport in the MPD information. The completion of the rendering realizes playback and output of the 3D image, for example, the audio content is output through a speaker/earphone, and the 3D image is displayed through a display device. The viewpoint may refer to immersive media content acquired by the capture device during the immersive media production process. The viewport may refer to the part of the immersive media content that is watched by a user during the immersive media presentation process.

The immersive media system supports boxes. The box refers to a data block or an object that includes metadata. That is, the box includes the metadata of corresponding media content. In the related art, the metadata of a viewport is recorded using a recommended viewport box (RcvpInfoBox). Grammars of the recommended viewport box (RcvpInfoBox) of immersive media are shown in Table 1:

TABLE 1

```
class RcvpInfoBox extends FullBox('rvif', version, 0) {
    unsigned int(8) viewport_type;
    string viewport_description;
    if (version > 0) {
        unsigned int(2) viewpoint_idc;
        bit(6) reserved = 0;
        if(viewpoint_idc == 1)
            unsigned int(32) rvif_viewpoint_id;
    }
}
class RecommendedViewportSample( ) extends SphereRegionSample( ) {
    if (viewpoint_idc == 2)
        unsigned int(32) viewpoint_id;
}
```

Semantics of the grammars shown in the above Table 1 are as follows:

viewport_type: a type of a recommended viewport. A value of 0 indicates that the recommended viewport is clipped by a media producer, and a value of 1 indicates that the recommended viewport is obtained according to big data statistics.

viewport_description: description information of the recommended viewport. The description information is an eight-bit (UTF-8) string ending with a null character.

viewpoint_idc: in a case that a value of this field is 0, it means that all media tracks associated with the current media track belong to the same viewpoint; in a case that a value of this field is 1, it means that an identifier (ID) of a viewpoint associated with an entry of a current recommended track is determined according to rvif_viewpoint_id; and in a case that a value of this field is 2, it means that some samples in the media track correspond to a particular viewpoint.

rvif_viewpoint_id: an ID of a viewpoint to which all samples corresponding to a sample entry belong.

viewpoint_id: an ID of a viewpoint to which a sample belongs.

In some embodiments, a track refers to a series of samples with time attributes that are encapsulated in an ISO base media file format (ISOBMFF), such as a video track, which is obtained by encapsulating a bitstream generated by encoding each frame by a video encoder according to the ISOBMFF specification. One track may correspond to one entry, or called as sample entry.

From the above semantics, it can be known that in RcvpInfoBox, in the case that the value of the viewpoint_idc is 1, one viewpoint may correspond to one recommended viewport, which corresponds to a scene in which different viewpoints have different recommended viewports; and in the case that the value of the viewpoint_idc is 2, one recommended viewport may change between a plurality of viewpoints, that is, one recommended viewport may correspond to a plurality of viewpoints. In other words, in the above two scenes, the viewpoints need to be switched with the recommended viewport, which cannot provide users with a user experience of flexible viewpoint and viewport switching.

In view of this, some embodiments provide a data processing method for immersive media, which can encapsulate switching information of a viewpoint and switching information of a recommended viewport in the recommended viewport box. In this way, the media playback device can flexibly switch the viewpoint and the recommended viewport according to the switching information of the viewpoint and the switching information of the recommended viewport, thereby improving the user experience.

Figure 3:
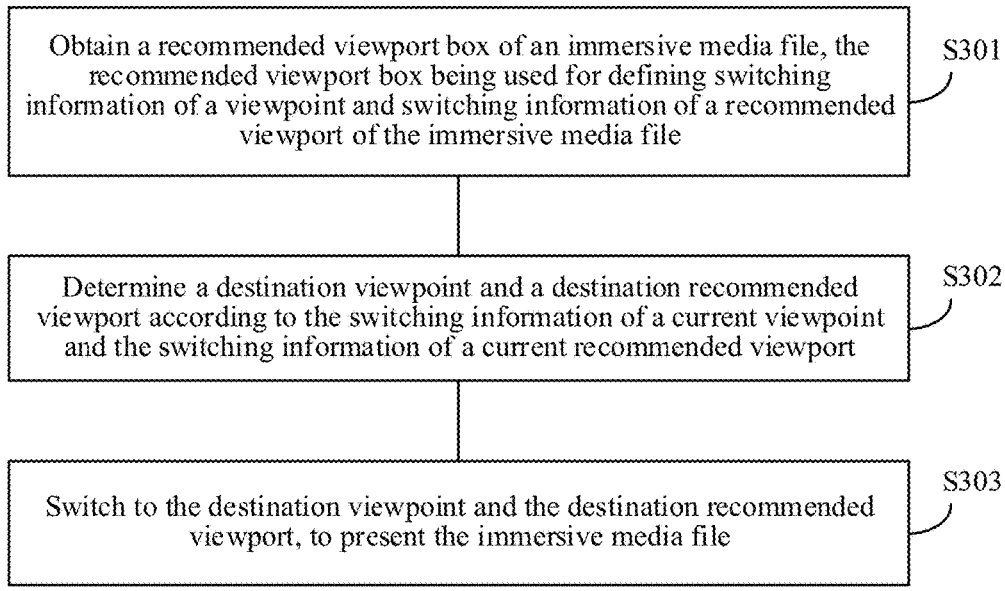
FIG. 3 is a schematic flowchart of a data processing method for immersive media according to some embodiments.

FIG. 3 is a schematic flowchart of a data processing method for immersive media according to some embodiments. This method may be performed by the media playback device (or called as media consumption device) in the immersive media system. The media consumption device may be a device with a point cloud media codec capability, such as a server, a drone, a handheld terminal, etc., which is not limited herein.

As shown in FIG. 3, the method may include at least part of the following content:

S301: Obtain a recommended viewport box of an immersive media file. The recommended viewport box is used for defining switching information of a viewpoint and switching information of a recommended viewport of the immersive media file.

S302: Determine a destination viewpoint and a destination recommended viewport according to the switching information of a current viewpoint and the switching information of a current recommended viewport.

S303: Switch to the destination viewpoint and the destination recommended viewport, to present the immersive media file.

In some embodiments, in a case that the media consumption device selects to browse the immersive media in a recommended browsing mode, the media consumption device switches the viewpoint and the viewport according to the switching of the viewpoint and the viewport in the recommended viewport box.

The recommended browsing mode may refer to browsing each sample of an immersive media according to recommended viewports (such as viewports recommended by directors/content producers).

In some embodiments, the recommended viewport box includes:

a viewpoint switch field (denoted as viewpoint_switch), used for indicating whether it needs to switch to another viewpoint after presenting a specific recommended viewport corresponding to the current viewpoint. The current viewpoint corresponds to at least one recommended viewport.

For example, a value of the viewpoint switch field is 1, indicating that it needs to switch to another viewpoint after presenting the specific recommended viewport corresponding to the current viewpoint; and a value of the viewpoint switch field is 0, indicating that it does not need to switch to another viewpoint after presenting the specific recommended viewport corresponding to the current viewpoint.

Therefore, in some embodiments, whether it needs to switch to another viewpoint after presenting the specific recommended viewport corresponding to the current viewpoint may be determined according to the viewpoint switch field, and if yes, operation S302 is performed.

In some embodiments, the recommended viewport box includes:

a destination viewpoint field (denoted as des_viewpoint_id), used to indicate the destination viewpoint that needs to be switched to after the current recommended viewport is presented; and a destination recommended viewport field (denoted as des_viewport_id), used to indicate the destination recommended viewport to be switched to after presenting the current recommended viewport and switching to the destination viewpoint.

In some embodiments, in a case that the viewpoint switch field indicates that it needs to switch to another viewpoint, the destination viewpoint and the destination recommended viewport may be determined according to the destination viewpoint field and the destination recommended viewport field. In this case, the destination viewpoint field represents the switching information of the current viewpoint, and the destination recommended viewport field represents the switching information of the current recommended viewport.

In some embodiments, a value of the destination viewpoint field may be an identifier of the destination viewpoint.

In some embodiments, a value of the destination recommended viewport field may be an identifier of a recommended video.

In some possible embodiments, the recommended viewport box includes: an independent viewport field (independent_viewport), used for indicating whether each viewpoint corresponds to an independent group of recommended viewports.

As an example, a value of the independent viewport field is a first value, such as 1, which indicates that each viewpoint corresponds to an independent group of recommended viewports. In other words, each group of recommended viewports corresponds to an independent viewpoint, that is, the two are in one-to-one correspondence.

The independent viewpoint corresponding to each group of recommended viewports is determined according to a viewpoint identifier ID field in a sample entry of each recommended viewport.

As another example, a value of the independent viewport field is a second value, such as 0, which indicates that each viewpoint corresponds to the same group of recommended viewports. In this case, there is only one recommended viewport entry, and all viewpoints correspond to this recommended viewport entry.

In other words, in a case that the value of the independent viewport field is 1, it means that each group of recommended viewports (namely one recommended viewport entry) only corresponds to content of a certain viewpoint. In a case that the value of the independent viewport field is 0, it means that there is only one group of recommended viewports, which corresponds to content of all the viewpoints.

In the related art, viewpoint information in the recommended viewport box only includes label information of the viewpoints. In a case that one viewpoint includes a plurality of pieces of media content, diversified presentation of the viewpoint cannot be realized.

Therefore, in some embodiments, an encapsulation file of the immersive media may further include a viewpoint entity group box (ViewpointEntityGroupBox), used for recording a label of each entity that constitutes a viewpoint.

Each entity that constitutes a viewpoint may refer to each media component, such as video, audio, background audio, etc., which is not limited herein.

In this way, when switching to a certain viewpoint, the media consumption device may obtain the label of each entity of the viewpoint, and perform rendering based on each entity of the viewpoint, which facilitates diversified presentation of the viewpoint.

In an example embodiment, the recommended viewport box and the viewpoint entity group box may be realized by extending an ISOBMFF box.

As an example, the recommended video box may include a viewpoint information box (AssoRcViewpointInfoBox) as shown in Table 2 and a recommended viewport sample box (RecommendedViewportSample) as shown in Table 3. The viewpoint information box and the recommended viewport sample box are respectively used for defining the above fields.

TABLE 2

```
class AssoRcViewpointInfoBox extends FullBox('avpo', 0, 0) {
    unsigned int(1) independent_viewport;
    unsigned int(1) viewpoint_switch;
    bit(6) reserved;
    if(independent_viewport) {
        unsigned int(32) viewpoint_id;
    }
}
```

TABLE 3

```
class RecommendedViewportSample( ) extends SphereRegionSample( ) {
    unsigned int(32) viewport_id;
if (viewpoint_switch){
    unsigned int(32) des_viewpoint_id;
    unsigned int(32) des_viewport_id;
}
}
```

The definition of each field in Table 2 and Table 3 may refer to the above description.

As an example, the viewpoint entity group box may be defined in a manner as shown in Table 4.

TABLE 4

```
aligned(8) class ViewpointEntityGroupBox extends
EntityToGroupBox('vipo',0,0) {
    string viewpoint_label;
    unsigned int(32) group_id;
    unsigned int(32) num_entities_in_group;
    for(i=0; i<num_entities_in_group; i++){
        unsigned int(32) entity_id;
        string viewpoint_entity_label;
    }
}
```

Semantics of grammars shown in Table 4 are as follows:
viewpoint_label: label information of a viewpoint, such as a string ended with a null character.
group_id: a group ID of the current entity group.
num_entities_in_group: the number of entities in the current entity group.
entity_id: an ID of an entity, which corresponds to a track ID or an item ID.
viewpoint_entity_label: a label of each entity that constitutes the current viewpoint, which, for example, may be a string ended with a null character.

The encapsulation manner as shown in Table 2, Table 3 and Table 4 is only exemplary. In some embodiments, the above fields may be encapsulated in other manners, which is not limited herein.

In addition, the recommended viewport box further includes a recommended viewport description field, used for indicating description information of a recommended viewport (e.g., a first recommended viewport type is recommended by author XX). This description information is an eight-bit (UTF-8) string ending with a null character.

In some embodiments, S301 may specifically include:
obtaining an encapsulation file of the immersive media file from the media production device; and
decapsulating the encapsulation file of the immersive media file, to obtain the recommended viewport box of the immersive media file.

The transfer and decapsulation processes of the encapsulation file of the immersive media may refer to the description of the embodiments shown in FIG. 1 and FIG. 2, which is not detailed herein.

Therefore, in some embodiments, the media consumption device obtains the encapsulation file of the immersive media from the media production device, and decapsulates the encapsulation file of the immersive media, to obtain the recommended viewport box of the immersive media. The recommended viewport box is used for defining the switching information of a viewpoint and the switching information of a recommended viewport of the immersive media. Further, the media consumption device may determine the destination viewpoint and the destination recommended viewport according to the switching information of the current viewpoint and the switching information of the current recommended viewport defined in the recommended viewport box, and then switch to the destination viewpoint and the destination recommended viewport for presenting the immersive media file. This solution can flexibly determine the switching manner according to the switching information of the viewpoint and the switching information of the recommended viewport defined in the recommended viewport box, to switch the viewpoint and the recommended viewport, which makes the presentation forms of the immersive media more diversified, thereby improving the user experience.

Figure 4:
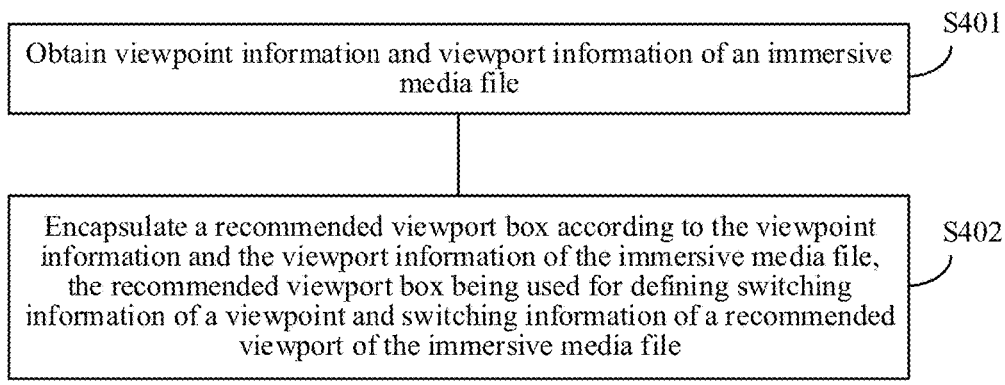
FIG. 4 is a schematic flowchart of another data processing method for immersive media according to some embodiments.

FIG. 4 is a schematic flowchart of a data processing method for immersive media according to some embodiments. This method may be performed by the media production device in the immersive media system. The media production device may be a device with a point cloud media codec capability, such as a server, a drone, a handheld terminal, etc., which is not limited herein.

As shown in FIG. 4, the method may include at least part of the following content:

S401: Obtain viewpoint information and viewport information of an immersive media file.

S402: Encapsulate a recommended viewport box according to the viewpoint information and the viewport information of the immersive media file. The recommended viewport box is used for defining switching information of a viewpoint and switching information of a recommended viewport of the immersive media file.

In some embodiments, the method further includes:

encapsulating the recommended viewport box into an encapsulation file of the immersive media file, and transmitting the encapsulation file of the immersive media file to the media playback device.

The production and encapsulation processes of the immersive media may refer to the related description in the embodiments as shown in FIG. 1 and FIG. 2, which is not detailed herein for the sake of brevity.

In some embodiments, the recommended viewport box includes:

a viewpoint switch field, used for indicating whether it needs to switch to another viewpoint after presenting a specific recommended viewport corresponding to the current viewpoint. The current viewpoint corresponds to at least one recommended viewport.

In some embodiments, the recommended viewport box includes:

a destination viewpoint field, used for indicating a destination viewpoint that needs to be switched to after presenting a current recommended viewport; and a destination recommended viewport field, used for indicating a destination recommended viewport that needs to be switched to after presenting the current recommended viewport and switching to the destination viewpoint.

In some possible embodiments, the recommended viewport box includes: an independent viewport field, used for indicating whether the viewpoint corresponds to an independent group of recommended viewports.

In some possible embodiments, a value of the independent viewport field is a first value, indicating that each viewpoint corresponds to an independent group of recommended viewports.

A value of the independent viewport field is a second value, indicating that each viewpoint corresponds to the same group of recommended viewports.

In some embodiments, the recommended viewport box further includes: a viewpoint entity group box, used for recording a label of each entity that constitutes the viewpoint.

Therefore, in some embodiments, the media production device may encapsulate the recommended viewport box according to the viewpoint information and the viewport information of the immersive media, how to encapsulate the recommended viewport box into the encapsulation file of the immersive media, and further transmit the encapsulation file of the immersive media to the media consumption device. Accordingly, the media consumption device decapsulates the encapsulation file of the immersive media, to obtain the viewport box of the immersive media, and switches the viewpoint and the recommended viewport according to the switching manner defined by the viewport box, which makes the presentation forms of the immersive media more diversified, thereby improving the user experience.

The solution of some embodiments is detailed below through a complete example.

First, the media production device encapsulates a recommended viewport box according to viewpoint information and recommended viewports corresponding to viewpoints of an acquired media file A, and encapsulates viewpoint entity group boxes according to each entity that constitutes the viewpoints. The media file A has two viewpoints VPI1 and VPI2, where VPI1 is an initial viewpoint. VPI1 corresponds to the recommended viewports vp11, vp12 and vp13, where vp11 is an initial viewport. VPI2 corresponds to the recommended viewport vp21 and vp22, where vp21 is an initial viewport.

Information recorded by the recommended viewport box is as follows:

VPI1(independent_viewport=1; viewpoint_switch=1); vp11, vp12(des_viewpoint_id=2; des_viewport_id=21), vp13;

VPI2(independent_viewport=1; viewpoint_switch=1); vp21, vp22 (des_viewpoint_id=1; des_viewport_id=13);

The viewpoint entity group box corresponding to each viewpoint is generated according to the constituent entities of VPI1 and VPI2. VPI1 includes two entity components "video" and "audio"; and VPI2 includes three entity components "video", "audio" and "background video".

After the recommended viewport box has been configured, the media production device encapsulates the recommended viewport box into an encapsulation file of the immersive media, and transmits the encapsulation file of the immersive media to the media consumption device. For example, in a case of receiving a request from the media consumption device, the media production device may transmit the encapsulation file of the immersive media to the media consumption device.

At the media consumption device side, if a user selects to enter a recommended browsing mode, since VPI1 is the initial viewpoint, consumption starts from VPI1. In this case, according to the labels of the constituent entities of VPI1, a video track and an audio track are obtained and then rendered respectively.

In VPI1, the recommended viewport vp11 is the initial viewport, so the recommended viewport vp11 is presented first, and according to sample information of a recommended viewport track, each recommended viewport in the track is rendered in sequence. When rendering the recommended viewport vp12, it can be known, by parsing metadata information (e.g. (des_viewpoint_id=2; des_viewport_id=21)) in the sample corresponding to vp12, that after consuming vp12, it needs to jump to the viewpoint VPI2, and start consuming the recommended viewport vp21.

The media consumption device switches to the viewpoint VPI2 and the recommended viewport vp21, and according to the labels of the constituent entities of VPI2, obtains and renders a video track, an audio track and a background video track respectively.

After consuming the recommended viewport vp21, the media consumption device renders each recommended viewport in sequence according to the sample information of the recommended viewport track. For example, after presenting the recommended viewport vp22, according to metadata information (e.g. (des_viewpoint_id=1; des_viewport_id=13)) in the sample of the recommended viewport vp22, the media consumption device jumps to the recommended viewport vp13 to continue consumption, after consuming the recommended viewport vp22.

Therefore, the embodiments can realize flexible and independent switching of viewpoints and viewports, thereby improving the user experience.

With reference to FIG. 3 to FIG. 4, the above description details the method according to some embodiments. In order to better implement the foregoing solution of the embodiments, with reference to FIG. 5 to FIG. 8, the following describes an apparatus according to some embodiments. The apparatus embodiments and the method embodiments correspond to one another. Similar description may refer to the method embodiments, which is not detailed herein for the sake of brevity.

Figure 5:
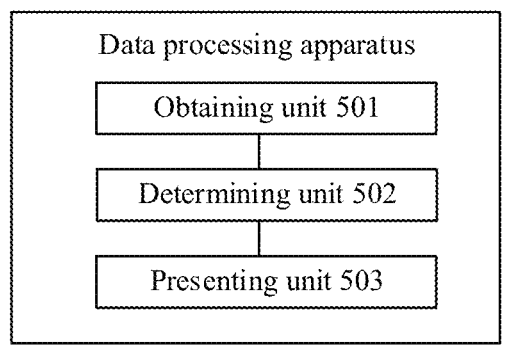
FIG. 5 is a schematic structural diagram of a data processing apparatus for immersive media according to some embodiments.

FIG. 5 shows a schematic structural diagram of a data processing apparatus for immersive media according to some embodiments. The data processing apparatus for immersive media may be a computer program (including program codes) running in the media consumption device. For example, the data processing apparatus for immersive media may be an application software in the media consumption device. As shown in FIG. 5, the data processing apparatus includes an obtaining unit 501, a determining unit 502 and a presenting unit 503. The data processing apparatus as shown in FIG. 5 may be configured to execute some or all of the method embodiments described in FIG. 3.

In some embodiments, the obtaining unit 501 is configured to obtain a recommended viewport box of an immersive media file. The recommended viewport box is used for defining switching information of a viewpoint and switching information of a recommended viewport of the immersive media file.

The determining unit 502 is configured to determine a destination viewpoint and a destination recommended viewport according to the switching information of a current viewpoint and the switching information of a current recommended viewport.

The presenting unit 503 is configured to switch to the destination viewpoint and the destination recommended viewport, to present the immersive media file.

In some embodiments, the recommended viewport box includes a viewpoint switch field.

The determining unit 502 may be further configured to determine whether it needs to switch to another viewpoint after presenting a specific recommended viewport corresponding to the current viewpoint according to the viewpoint switch field. The current viewpoint corresponds to at least one recommended viewport.

If yes, the determining unit 502 performs the operation of determining a destination viewpoint and a destination recommended viewport according to the switching information of a current viewpoint and the switching information of a current recommended viewport.

In some embodiments, the recommended viewport box may include a destination viewpoint field, used for indicating the destination viewpoint to be switched to after presenting the current recommended viewport; and a destination recommended viewport field, used for indicating the destination recommended viewport to be switched to after presenting the current recommended viewport and switching to the destination viewpoint.

The determining unit 502 is configured to determine the destination viewpoint according to the destination viewpoint field and determine the destination recommended viewport according to the destination recommended viewport field. The destination viewpoint field represents the switching information of the current viewpoint, and the destination recommended viewport field represents the switching information of the current recommended viewport.

In some embodiments, the recommended viewport box may include: an independent viewport field, used for indicating whether the viewpoint corresponds to an independent group of recommended viewports.

In some embodiments, a value of the independent viewport field is a first value, indicating that each viewpoint corresponds to an independent group of recommended viewports.

A value of the independent viewport field is a second value, indicating that each viewpoint corresponds to the same group of recommended viewports.

In some embodiments, the recommended viewport box may further include: a viewpoint entity group box, used for recording a label of each entity that constitutes the viewpoint.

In some embodiments, the presenting unit 503 may be further configured to:

render each entity of the destination viewpoint, according to the label of each entity of the destination viewpoint.

In some embodiments, the obtaining unit 501 may be specifically configured to:

obtain an encapsulation file of the immersive media file from the media production device; and decapsulate the encapsulation file of the immersive media file, to obtain the recommended viewport box of the immersive media file.

According to some embodiments, units of the data processing apparatus for immersive media shown in FIG. 5 may be separately or wholly combined into one or several other units, or one (or more) of the units herein may further be divided into multiple units of smaller functions. In this way, same operations can be implemented, and implementation of the technical effects of the embodiments is not affected. The foregoing units are divided based on logical functions. In an actual application, a function of one unit may also be implemented by a plurality of units, or functions of a plurality of units are implemented by one unit. In some embodiments, the data processing apparatus for immersive media may also include other units. During actual application, the functions may also be cooperatively implemented by other units and may be cooperatively implemented by a plurality of units. According to some embodiments, a computer program (including program code) that can perform the operations in the corresponding method shown in FIG. 3 may be run on a general computing device, such as a computer, which includes processing elements and storage elements such as a central processing unit (CPU), a random access memory (RAM), and a read-only memory (ROM), to construct the data processing apparatus for immersive media shown in FIG. 3 and implement the data processing method for immersive media in some embodiments. The computer program may be recorded on, for example, a computer-readable recording medium, and may be loaded into the foregoing computing device by using the computer-readable recording medium and run on the computing device.

Based on the same inventive concept, the data processing apparatus for immersive media according to some embodiments has the same problem-solving principle and beneficial effects as the data processing method for immersive media according to some embodiments. Thus, reference may be made to the implementation principle and the beneficial effects of the method, which is not detailed herein for the sake of brevity.

Figure 6:
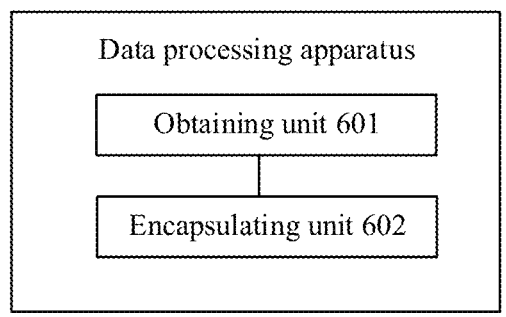
FIG. 6 is a schematic structural diagram of another data processing apparatus for immersive media according to some embodiments.

FIG. 6 shows a schematic structural diagram of another data processing apparatus for immersive media according to some embodiments. The data processing apparatus for immersive media may be a computer program (including program codes) running in the media production device. For example, the data processing apparatus for immersive media may be an application software in the media production device. As shown in FIG. 6, the data processing apparatus for immersive media includes an obtaining unit 601 and an encapsulating unit 602. Each unit is detailed as follows:

The obtaining unit 601 is configured to obtain viewpoint information and viewport information of an immersive media file.

The encapsulating unit 602 is configured to encapsulate a recommended viewport box according to the viewpoint information and the viewport information of the immersive media file. The recommended viewport box is used for defining switching information of a viewpoint and switching information of a recommended viewport of the immersive media file.

In some embodiments, the recommended viewport box may include:
 a viewpoint switch field, used for indicating whether it needs to switch to another viewpoint after presenting a specific recommended viewport corresponding to the current viewpoint. The current viewpoint corresponds to at least one recommended viewport.
In some embodiments, the recommended viewport box may include:
 a destination viewpoint field, used for indicating a destination viewpoint to be switched to after presenting a current recommended viewport; and
 a destination recommended viewport field, used for indicating a destination recommended viewport to be switched to after presenting the current recommended viewport and switching to the destination viewpoint.

In some embodiments, the recommended viewport box may include: an independent viewport field, used for indicating whether the viewpoint corresponds to an independent group of recommended viewports.

In some embodiments, a value of the independent viewport field is a first value, indicating that each viewpoint corresponds to an independent group of recommended viewports.

A value of the independent viewport field is a second value, indicating that each viewpoint corresponds to the same group of recommended viewports.

In some embodiments, the recommended viewport box may further include: a viewpoint entity group box, used for recording a label of each entity that constitutes the viewpoint.

In some embodiments, the encapsulating unit 602 may be further configured to: encapsulate the recommended viewport box into an encapsulation file of the immersive media file.

The data processing apparatus further includes: a transmission unit, configured to transmit the encapsulation file of the immersive media file to the media playback device.

According to some embodiments, units of the data processing apparatus for immersive media shown in FIG. 6 may be separately or wholly combined into one or several other units, or one (or more) of the units herein may further be divided into multiple units of smaller functions. In this way, same operations can be implemented, and implementation of the technical effects of the embodiments is not affected. The foregoing units are divided based on logical functions. In an actual application, a function of one unit may also be implemented by a plurality of units, or functions of a plurality of units are implemented by one unit. In some embodiments, the data processing apparatus for immersive media may also include other units. During actual application, the functions may also be cooperatively implemented by other units and may be cooperatively implemented by a plurality of units. According to some embodiments, a computer program (including program code) that can perform the operations in the corresponding method shown in FIG. 4 may be run on a general computing device, such as a computer, which includes processing elements and storage elements such as a central processing unit (CPU), a random access memory (RAM), and a read-only memory (ROM), to construct the data processing apparatus for immersive media shown in FIG. 4 and implement the data processing method for immersive media in the embodiments. The computer program may be recorded on, for example, a computer-readable recording medium, and may be loaded into the foregoing computing device by using the computer-readable recording medium and run on the computing device.

Based on the same inventive concept, the data processing apparatus for immersive media according to the embodiments has the same problem-solving principle and beneficial effects as the data processing method for immersive media according to the embodiments. Thus, reference may be made to the implementation principle and the beneficial effects of the method, which is not detailed herein for the sake of brevity.

It is to be noted that, some embodiments may further provide a computer device, which may be the media production device or the media playback device. In the following, the media production device and the media playback device will be described respectively.

Figure 7:
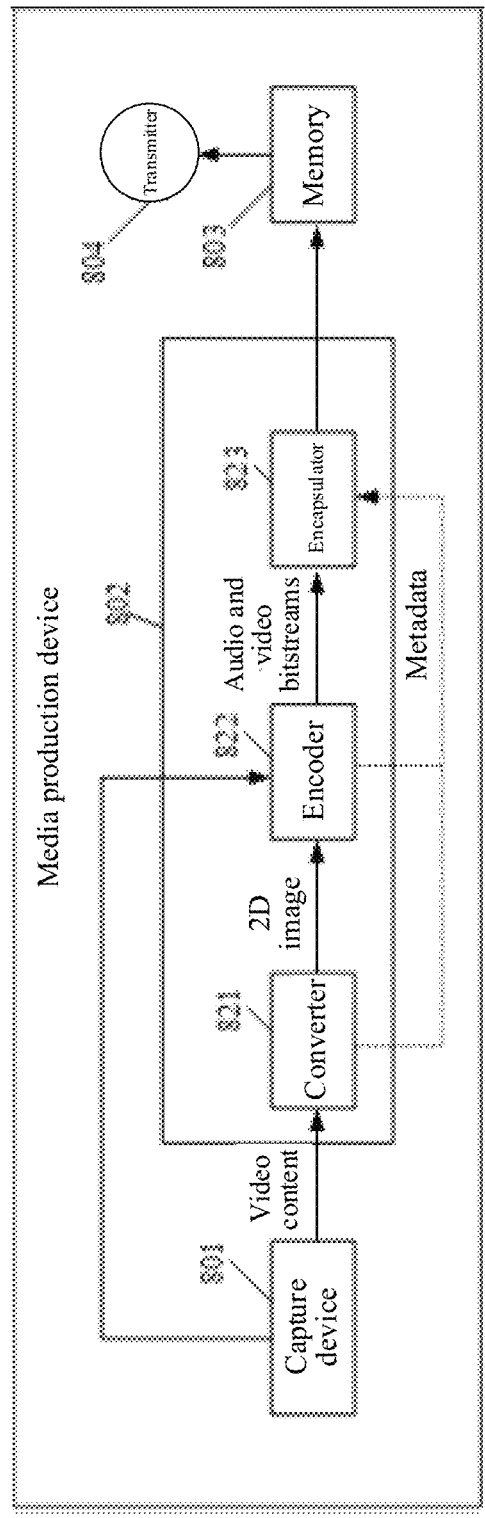
FIG. 7 is a schematic structural diagram of a media production device according to some embodiments.

FIG. 7 shows a schematic structural diagram of a media production device according to some embodiments. The media production device may refer to a computer device used by a provider of immersive media, and the computer device may be a terminal (e.g., a PC, a smart mobile device (e.g., a smartphone, etc.) or a server. As shown in FIG. 7, the media production device includes a capture device 801, a processor 802, a memory 803 and a transmitter 804.

The capture device 801 is configured to capture real-world sound-visual scenes, to obtain raw data of the immersive media (including audio content and video content synchronized in time and space). The capture device 801 may include but is not limited to: an audio device, a camera device and a sensing device. The audio device may include an audio sensor, a microphone, etc. The camera device may include an ordinary camera, a stereo camera, a light field camera, etc. The sensing device may include a laser device, a radar device, etc.

The processor 802 (or called as central processing unit (CPU)) is a processing core of the media production device. The processor 802 is suitable to implement one or more program instructions, specifically suitable to load and execute the one or more program instructions, to perform the process of the data processing method for immersive media as shown in FIG. 3.

The memory 803 is a memory device in the media production device, configured to store a program and a media resource. It may be understood that the memory 803 herein may include an internal storage medium of the media production device and certainly may also include an extended storage medium supported by the media production device. It is to be noted that, the memory may be a high-speed RAM, or may be a non-volatile memory, for example, at least one magnetic disk memory. The memory may be at least one memory far away from the foregoing processor. The memory provides a storage space, which is configured to store an operating system of the media production device. Also, the storage space is further configured to store a computer program. The computer program includes program instructions, and the program instructions are suitable for being called and executed by a processor, to perform each operation of the data processing method for immersive media. In addition, the memory 803 may be further configured to store the immersive media file generated through processing by the processor. The immersive media file includes a media file resource and MPD information.

The transmitter 804 is configured to realize transmission interaction between the media production device and other devices, and specifically configured to realize transmission of the immersive media between the media production device and the media playback device. That is, the media production device transmits the relevant media resource of the immersive media to the media playback device through the transmitter 804.

Referring to FIG. 7 again, the processor 802 may include a converter 821, an encoder 822 and an encapsulator 823.

The converter 821 is configured to perform a series of conversion processing on the captured video content, to make the video content into content that is suitable for undergoing video encoding of the immersive media. The conversion processing may include: splicing and projection. Optionally, the conversion processing further includes regional encapsulation. The converter 821 may convert the captured 3D video content into a 2D image, and provide the 2D image to the encoder for video encoding.

The encoder 822 is configured to perform audio encoding on the captured audio content to obtain an audio bitstream of the immersive media, and further configured to perform video encoding on the 2D image converted by the converter 821, to obtain a video bitstream.

The encapsulator 823 is configured to encapsulate the audio bitstream and the video bitstream in a file container according to the file format (such as ISOBMFF) of the immersive media, to generate the media file resource of the immersive media, the media file resource being a media file or media segments to form the media file of the immersive media; and according to the file format requirement of the immersive media, record the metadata of the media file resource of the immersive media using the MPD information. The encapsulation file of the immersive media obtained through processing by the encapsulator is stored in the memory, and provided to the media playback device on demand for presenting the immersive media.

In an example embodiment, the processor 802 (specifically, each component included in the processor) performs each operation of the data processing method for immersive media as shown in FIG. 4 by calling one or more instructions in the memory 803. Specifically, the memory 803 stores one or more first instructions, which are suitable for being loaded by the processor 802 and performing the following operations:

obtaining viewpoint information and viewport information in a case of presenting an immersive media file; and encapsulating a recommended viewport box according to the viewpoint information and the viewport information of the immersive media file, the recommended viewport box being used for defining switching information of a viewpoint and switching information of a recommended viewport of the immersive media file.

In an example embodiment, the processor 802, by running the executable program codes in the memory 803, further performs the following operations: encapsulating the recommended viewport box into an encapsulation file of the immersive media file, and transmitting the encapsulation file of the immersive media file to the media playback device.

Based on the same inventive concept, the data processing apparatus for immersive media provided by the embodiments has the same problem-solving principle and beneficial effects as the data processing method for immersive media provided by the embodiments. Thus, reference may be made to the implementation principle and the beneficial effects of the method, which is not detailed herein for the sake of brevity.

Figure 8:
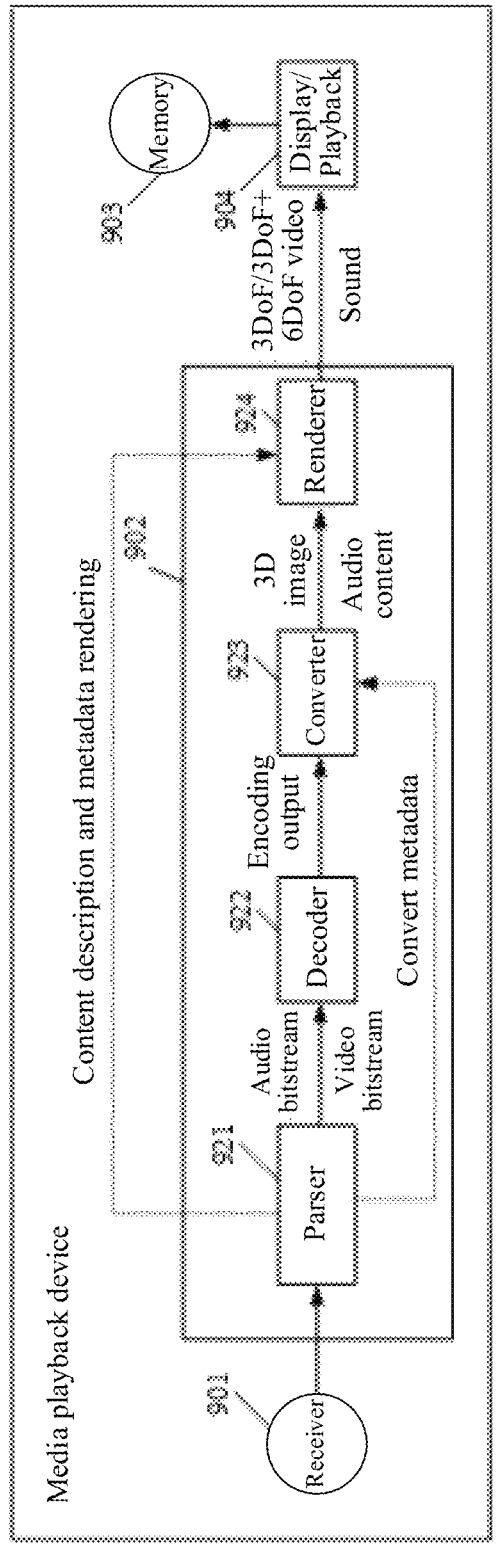
FIG. 8 is a schematic structural diagram of a media playback device according to some embodiments.

FIG. 8 shows a schematic structural diagram of a media playback device according to some embodiments. The media playback device may refer to a computer device used by a user of the immersive media. The computer device may be a terminal (e.g., a PC, a smart mobile device (e.g., a smart phone), a VR device (e.g., a VR helmet, VR glasses, etc.)). As shown in FIG. 8, the media playback device includes a receiver 901, a processor 902, a memory 903 and a display/playback device 904.

The receiver 901 is configured to realize transmission interaction between decoding and other devices, and specifically configured to realize transmission of the immersive media between the media production device and the media playback device. That is, the media playback device receives the relevant media resource of the immersive media from the media production device through the receiver 901.

The processor 902 (or called as central processing unit (CPU)) is a processing core of the media production device. The processor 902 is suitable to implement one or more program instructions, specifically suitable to load and execute the one or more programs instructions, to perform the process of the data processing method for immersive media as shown in FIG. 3.

The memory 903 is a memory device in the media playback device, which is configured to store a program and a media resource. The memory 903 herein may include both a built-in storage medium in the media playback device, and may also include an extended storage medium supported by the media playback device. It is to be noted that, the memory 903 may be a high-speed RAM, or may be a non-volatile memory, for example, at least one magnetic disk memory. The memory 903 may be at least one memory far away from the foregoing processor. The memory 903 provides a storage space, which is configured to store an operating system of the media playback device. Also, the storage space is further configured to store a computer program. The computer program includes program instructions, and the program instructions are suitable for being called and executed by a processor, to perform each operation of the data processing method for immersive media. In addition, the memory 903 may be further configured to store the 3D image of the immersive media, the audio content corresponding to the 3D image, and information required for rendering the 3D image and the audio content, etc., which are generated through processing by the processor.

The display/playback device 904 is configured to output sound and the 3D image obtained through rendering.

Referring to FIG. 8 again, the processor 902 may include a parser 921, a decoder 922, a converter 923 and a renderer 924.

The parser 921 is configured to perform file decapsulation on the encapsulation file of the rendering media from the media production device, specifically configured to decapsulate the media file resource according to the file format requirement of the immersive media, to obtain an audio bitstream and a video bitstream; and provide the audio bitstream and the video bitstream to the decoder 922.

The decoder 922 performs audio decoding on the audio bitstream to obtain audio content, and provides the audio content to the renderer for audio rendering. In addition, the decoder 922 decodes the video bitstream to obtain a 2D image. According to the metadata provided by the MPD information, if the metadata indicates that the immersive media has performed the regional encapsulation process, the 2D image refers to an encapsulation image; and if the metadata indicates that the immersive media has not performed the regional encapsulation process, the plane image refers to a projection image.

The converter 923 is configured to convert the 2D image to a 3D image. If the immersive media has performed the regional encapsulation process, the converter 923 first performs regional decapsulation on the encapsulation image to obtain a projection image, and then performs reconstruction processing on the projection image to obtain the 3D image. If the rendering media has not performed the regional encapsulation process, the converter 923 directly performs reconstruction processing on the projection image to obtain the 3D image.

The renderer 924 is configured to render the audio content and the 3D image of the immersive media, and specifically configured to render the audio content and the 3D image according to the metadata related to rendering and the viewport in the MPD information. After the rendering is completed, the display/playback apparatus is responsible for outputting.

In an example embodiment, the processor 902 (specifically, each component included in the processor) performs each operation in the data processing method for immersive media as shown in FIG. 3 by calling one or more instructions in the memory 803. Specifically, the memory 903 stores one or more second instructions, which are suitable for being loaded by the processor 902 and performing the following operations:

obtaining a recommended viewport box of an immersive media file, the recommended viewport box being used for defining switching information of a viewpoint and switching information of a recommended viewport of the immersive media file;

determining a destination viewpoint and a destination recommended viewport according to the switching information of a current viewpoint and the switching information of a current recommended viewport; and switching to the destination viewpoint and the destination recommended viewport, to present the immersive media file.

As an example embodiment, the processor 902, by running the executable program codes in the memory 903, further performs the following operations: obtaining an encapsulation file of the immersive media file from the media production device; and decapsulating the encapsulation file of the immersive media file, to obtain the recommended viewport box of the immersive media file.

Based on the same inventive concept, the data processing apparatus for immersive media provided by the embodiments has the same problem-solving principle and beneficial effects as the data processing method for immersive media provided by the embodiments. Thus, reference may be made to the implementation principle and the beneficial effects of the method, which is not detailed herein for the sake of brevity.

Some embodiments further provide a non-transitory computer-readable storage medium, storing a computer program, the computer program being suitable for being loaded and executed by a processor to perform the foregoing method embodiments.

Some embodiments further provide a computer program product or a computer program. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the foregoing method embodiments.

It is to be noted that, for brief description, the foregoing method embodiments are redisplayed as a series of action combinations. However, a person skilled in the art is to appreciate that the disclosure is not limited to the described order of the actions, as some operations may be performed in other orders or simultaneously. In addition, a person skilled in the art is further to understand that the embodiments described in this specification are all example embodiments, and the involved actions and modules are not necessarily required by the disclosure.

A sequence of the operations of the method in the embodiments may be adjusted, and certain operations may also be combined or removed according to an actual requirement.

The modules, or code, in the apparatus in the embodiments may be combined, divided, and deleted according to an actual requirement.

A person of ordinary skill in the art may understand that all or some of the operations of the various methods in the foregoing embodiments may be implemented by a program instructing relevant hardware. The program may be stored in a computer-readable storage medium. The readable storage medium may include: a flash drive, a Read-Only Memory (ROM), a Random Access Memory (RAM), a magnetic disk, an optical disc, and the like.

It should be understood that, the processor of some embodiments may be an integrated circuit chip, and has a signal processing capability. During implementation, the operations of the foregoing method embodiment may be implemented by using a hardware integrated logic circuit in the processor or implemented by using an instruction in a software form.

The embodiments disclosed above are merely examples of embodiments of the disclosure, and are not intended to limit the protection scope of the disclosure. Therefore, equivalent variations made in accordance with the claims of the disclosure shall fall within the scope of the disclosure.

What is claimed is:

1. A data processing method for an immersive media file, performed by a media playback device and comprising:
   obtaining a recommended viewport box of the immersive media file, the recommended viewport box being used for defining switching information of a viewpoint and switching information of a recommended viewport of the immersive media file;
   determining a destination viewpoint and a destination recommended viewport according to the switching information of a current viewpoint and the switching information of a current recommended viewport; and
   switching to the destination viewpoint and the destination recommended viewport, to present the immersive media file, wherein
   based on a selection to browse the immersive media file in a recommended browsing mode, the data processing method further comprises switching each viewpoint and viewport according to the switching of the viewpoint and the viewport in the recommended viewport box, the recommend browsing mode being a mode of browsing each sample of an immersive media file according to the recommend viewport.

2. The data processing method according to claim 1, wherein the recommended viewport box comprises a viewpoint switch field, and the method further comprises:
   determining whether to switch to another viewpoint after presenting a specific recommended viewport corresponding to the current viewpoint according to the viewpoint switch field, the current viewpoint corresponding to at least one recommended viewport; and
   if yes, performing the operation of determining a destination viewpoint and a destination recommended viewport according to the switching information of a current viewpoint and the switching information of a current recommended viewport.

3. The data processing method according to claim 1, wherein the recommended viewport box comprises a destination viewpoint field used for indicating the destination viewpoint to be switched to after presenting the current recommended viewport; and a destination recommended viewport field used for indicating the destination recommended viewport to be switched to after presenting the current recommended viewport and switching to the destination viewpoint; and
   the determining comprises:
   determining the destination viewpoint according to the destination viewpoint field, and determining the destination recommended viewport according to the destination recommended viewport field, the destination viewpoint field representing the switching information of the current viewpoint, and the destination recommended viewport field representing the switching information of the current recommended viewport.

4. The data processing method according to claim 1, wherein the recommended viewport box comprises: an independent viewpoint field, used for indicating whether the viewpoint corresponds to an independent group of recommended viewports.

5. The data processing method according to claim 4, wherein a value of the independent viewpoint field being a first value indicates that each viewpoint corresponds to an independent group of recommended viewports; and
   a value of the independent viewpoint field being a second value indicates that each viewpoint corresponds to a same group of recommended viewports.

6. The data processing method according to claim 1, wherein the recommended viewport box further comprises: a viewpoint entity group box, used for recording a label of each entity that constitutes the viewpoint.

7. The data processing method according to claim 6, further comprising:
   rendering each entity of the destination viewpoint according to the label of each entity of the destination viewpoint.

8. The data processing method according to claim 1, wherein the obtaining comprises:
   obtaining an encapsulation file of the immersive media file from a media production device; and
   decapsulating the encapsulation file of the immersive media file, to obtain the recommended viewport box of the immersive media file.

9. A data processing apparatus for an immersive media file, comprising:
   at least one memory configured to store program code; and
   at least one processor configured to read the program code and operate as instructed by the program code, the program code comprising:
   obtaining code configured to cause the at least one processor to obtain a recommended viewport box of the immersive media file, the recommended viewport box being used for defining switching information of a viewpoint and switching information of a recommended viewport of the immersive media file;
   determining code configured to cause the at least one processor to determine a destination viewpoint and a destination recommended viewport according to the switching information of a current viewpoint and the switching information of a current recommended viewport; and
   presenting code configured to cause the at least one processor to switch to the destination viewpoint and the destination recommended viewport, to present the immersive media file, wherein
   based on a selection to browse the immersive media file in a recommended browsing mode, the presenting code is further configured to cause the at least one processor to switch each viewpoint and viewport according to the switching of the viewpoint and the viewport in the recommended viewport box, the recommend browsing mode being a mode of browsing each sample of an immersive media file according to the recommend viewport.

10. The data processing apparatus according to claim 9, wherein the recommended viewport box comprises a viewpoint switch field, and the determining code is further configured to cause the at least one processor to:
    determine whether to switch to another viewpoint after presenting a specific recommended viewport corresponding to the current viewpoint according to the viewpoint switch field, the current viewpoint corresponding to at least one recommended viewport; and
    if yes, perform the operation of determining a destination viewpoint and a destination recommended viewport according to the switching information of a current viewpoint and the switching information of a current recommended viewport.

11. The data processing apparatus according to claim 9, wherein the recommended viewport box comprises a destination viewpoint field used for indicating the destination viewpoint to be switched to after presenting the current recommended viewport; and a destination recommended viewport field used for indicating the destination recommended viewport to be switched to after presenting the current recommended viewport and switching to the destination viewpoint; and
    the determining code is further configured to cause the at least one processor to:
    determine the destination viewpoint according to the destination viewpoint field, and determine the destination recommended viewport according to the destination recommended viewport field, the destination viewpoint field representing the switching information of the current viewpoint, and the destination recommended viewport field representing the switching information of the current recommended viewport.

12. The data processing apparatus according to claim 9, wherein the recommended viewport box comprises: an independent viewpoint field used for indicating whether the viewpoint corresponds to an independent group of recommended viewports.

13. The data processing apparatus according to claim 12, wherein a value of the independent viewport field being a first value indicates that each viewpoint corresponds to an independent group of recommended viewports; and
    a value of the independent viewport field being a second value indicates that each viewpoint corresponds to a same group of recommended viewports.

14. The data processing apparatus according to claim 9, wherein the recommended viewport box further comprises: a viewpoint entity group box, used for recording a label of each entity that constitutes the viewpoint.

15. The data processing apparatus according to claim 14, wherein the presenting code is further configured to cause the at least one processor to:
    render each entity of the destination viewpoint according to the label of each entity of the destination viewpoint.

16. The data processing apparatus according to claim 9, wherein the obtaining code is further configured to cause the at least one processor to:
    obtain an encapsulation file of the immersive media file from a media production device; and
    decapsulate the encapsulation file of the immersive media file to obtain the recommended viewport box of the immersive media file.

17. A non-transitory computer-readable storage medium, storing computer code that when executed by at least one processor causes the at least one processor to:
    obtain a recommended viewport box of the immersive media file, the recommended viewport box being used for defining switching information of a viewpoint and switching information of a recommended viewport of the immersive media file;
    determine a destination viewpoint and a destination recommended viewport according to the switching information of a current viewpoint and the switching information of a current recommended viewport; and
    switch to the destination viewpoint and the destination recommended viewport to present the immersive media file, wherein
    based on a selection to browse the immersive media file in a recommended browsing mode, the switch comprises switching each viewpoint and viewport according to the switching of the viewpoint and the viewport in the recommended viewport box, the recommend browsing mode being a mode of browsing each sample of an immersive media file according to the recommend viewport.

18. The non-transitory computer-readable storage medium according to claim 17, wherein the recommended viewport box comprises a viewpoint switch field, and computer code is further configured to cause the at least one processor to:
    determine whether to switch to another viewpoint after presenting a specific recommended viewport corresponding to the current viewpoint according to the viewpoint switch field, the current viewpoint corresponding to at least one recommended viewport; and
    if yes, perform the operation of determining a destination viewpoint and a destination recommended viewport according to the switching information of a current viewpoint and the switching information of a current recommended viewport.

19. The non-transitory computer-readable storage medium according to claim 17, wherein the recommended viewport box comprises a destination viewpoint field used for indicating the destination viewpoint to be switched to after presenting the current recommended viewport; and a destination recommended viewport field used for indicating the destination recommended viewport to be switched to after presenting the current recommended viewport and switching to the destination viewpoint; and
    the determine comprises:
    determining the destination viewpoint according to the destination viewpoint field, and determining the destination recommended viewport according to the destination recommended viewport field, the destination viewpoint field representing the switching information of the current viewpoint, and the destination recommended viewport field representing the switching information of the current recommended viewport.

20. The non-transitory computer-readable storage medium according to claim 17, wherein the recommended viewport box comprises: an independent viewpoint field used for indicating whether the viewpoint corresponds to an independent group of recommended viewports.

* * * * *